June 10, 1924.  1,497,332
N. W. HARTMAN
GLASSWORKING MECHANISM
Original Filed Jan. 27, 1913   2 Sheets-Sheet 1
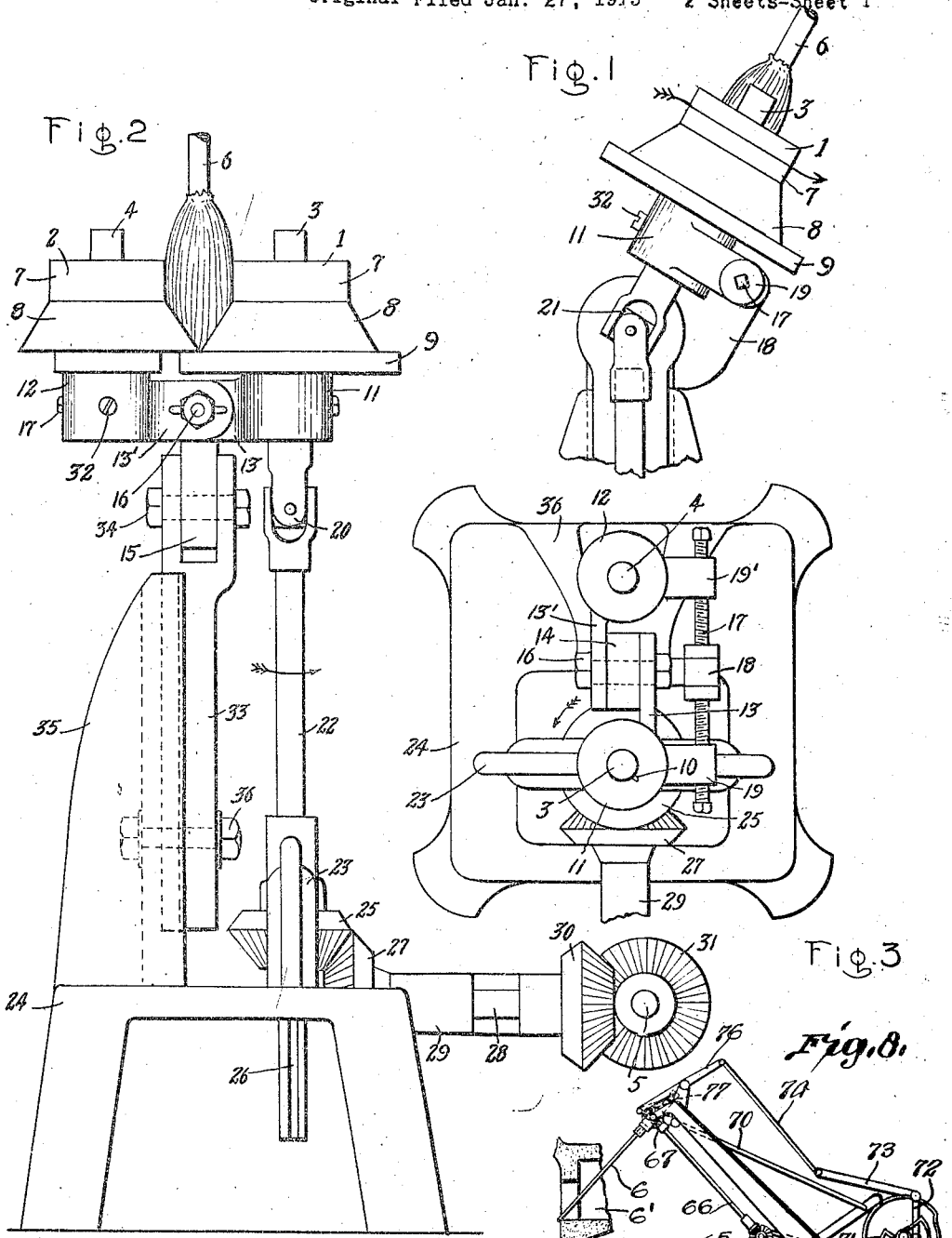
INVENTOR
NOBLE W. HARTMAN
BY Albert G. Davis
HIS ATTORNEY June 10, 1924.
N. W. HARTMAN
GLASSWORKING MECHANISM
Original Filed Jan. 27, 1913    2 Sheets-Sheet 2
1,497,332
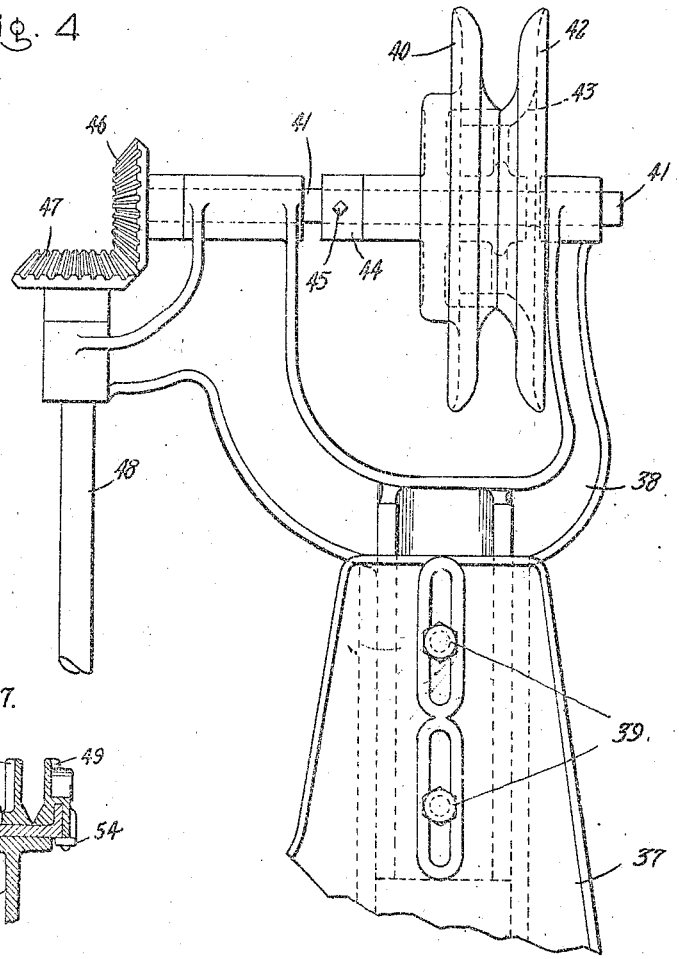
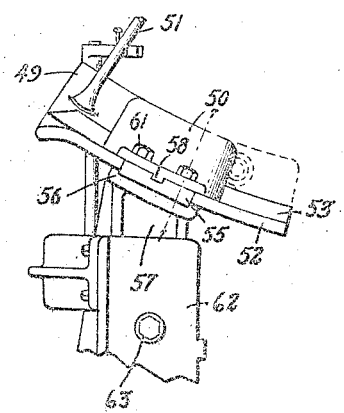
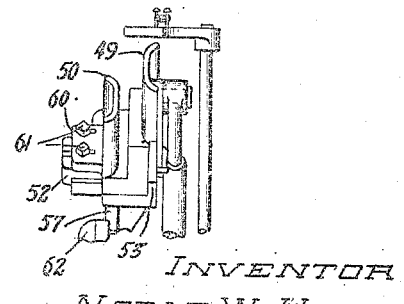
INVENTOR
NOBLE W. HARTMAN
BY
HIS ATTORNEY Patented June 10, 1924.

1,497,332

UNITED STATES PATENT OFFICE.

NOBLE W. HARTMAN, OF TOLEDO, OHIO, ASSIGNOR TO GENERAL ELECTRIC COMPANY, A CORPORATION OF NEW YORK.

GLASSWORKING MECHANISM.

Continuation in part of application Serial No. 744,549, filed January 27, 1913. Patent No. 1,408,000. This application filed February 3, 1920. Serial No. 355,902.

*To all whom it may concern:*

Be it known that I, NOBLE W. HARTMAN, a citizen of the United States, residing at Toledo, county of Lucas, State of Ohio, have invented certain new and useful Improvements in Glassworking Mechanism, of which the following is a specification.

My invention relates to the working of glass and comprises both certain novel methods of glass working and also novel mechanism for this purpose. In my application, Serial No. 744,549, patent No. 1,408,000, I have described a glass working machine which is adapted for automatic operation efficiently and economically with particular reference to its employment in the production of incandescent lamp bulbs; and while my present invention is described in connection with this machine, the invention is not confined to this machine but can be otherwise carried out and applied, and can be employed, also, in the production of articles other than bulbs for incandescent lamps. Among the various practical advantages obtainable in connection with my invention which will hereinafter become apparent are uniformity and quality of product.

This application is a continuation in part of my application, Serial No. 744,549, filed Jan. 27, 1913 under the title "Glass working mechanism and methods", now Patent No. 1,408,000. The operation of this machine will be briefly described hereinafter, but for a complete description reference should be made to the said application.

The machine disclosed in the above mentioned application is adapted to gather molten glass and to produce a complete lamp bulb therefrom. In this machine, the actual formation of a bulb is effected by blowing in a mold, and the machine comprises a so-called "blow-iron" on which a charge of glass may be carried and manipulated and which is adapted to cooperate with the mold and also with various other agencies and mechanisms, provision being made for relative movement of the blow-iron and these various agencies to bring them into cooperative relation in the most advantageous manner. After the blow-iron has gathered the charge of glass,—to outline briefly the general action of the machine,—the charge may when necessary be prepared and brought to such shape that the glass will be properly distributed in the blown article by suitable movement of the blow-iron, or by the direct action of suitable shaping means (which form the subject matter of the present application) upon the glass in a manner corresponding to the operation of hand blowing known as "marvering", or by both. The glass on the blow-iron having been brought into the mold and the latter closed, the blowing occurs, air under pressure passing through the blow-iron and expanding the glass against the walls of the mold. The blowing having been concluded and the mold opened, the blown bulb is withdrawn and is detached by a device, which may preferably act after the withdrawal of the bulb from the mold. Removal of any glass adhering to the blow-iron having been effected by a cleaning device, the blow-iron is ready for another charge of glass and the machine as a whole for another cycle of operations. The blow-iron is preferably rotated during the blowing, in order that the surface of the blown article may be perfectly smooth; and as such rotating does not necessarily interfere with the other operations, but may even be made to facilitate some or all of them, it need not be interrupted.

In the drawings, Fig. 1 is a side elevation of the marvering machine of my invention which may be employed for shaping the glass preparatory to the blowing operation; Fig. 2 is a front elevation of the marvering mechanism; Fig. 3 is a plan view of my invention with the marvering rolls removed; Fig. 4 is a side elevation of a modification of the marvering mechanism; Fig. 5 is a side elevation of a second modification of the marvering mechanism with the driving mechanism broken away; Fig. 6 is a plan view thereof, Fig. 7 is a partial section on the line 7—7 of Fig. 5, and Fig. 8 is a fragmental side elevation on a reduced scale showing a means for rotating and swinging the blowpipe or spindle.

I will now describe the preparatory shaping or marvering of the hot glass according to my method,—first briefly describing the ordinary practice of hand marvering for the sake of making clearer the distinctive features of my method. I will then describe several forms of mechanism which I have devised for carrying out my method.

In the manufacture of bulbs by hand, the operator sticks the end of the blow-iron in the molten glass in the furnace and gathers a ball or "gather" of glass thereon. He brings this gather of glass to the shape which he knows by experience will give the desired proper distribution of the glass in the walls of the blown article by rolling it back and forth on a flat topped iron table known as a marvering table. This he does by revolving the blow-iron between his hands,—usually first in one direction and then in the other,— varying the angle of the blow-iron with reference to the surface of the marvering table during the operation as may be necessary.

According to my method of "marvering," the gather of glass is shaped by the relative turning or rolling movement of the glass and one or more surfaces which give it any desired form, without the shifting of the axis of rotation which the hand operator resorts to in order to produce anything but a simple cylindrical or conical formation. According to this method, also, it is practicable to effect simultaneously all the deformations or "reformations" of the body of glass that may be necessary to secure the shape desired, and, in general, by a single relative turning or rolling movement of the glass and the part or parts comprising the surface or surfaces by which the shape of the glass is changed. It is very advantageous to duplicate the surfaces in question on opposite sides of the mass of glass; and if the glass is in a strict sense rolled between these surfaces, one or both of them will naturally move in a direction transverse to the axis of rotation of the body of glass and of the blow-iron (either from contact with the glass or because otherwise actuated), even though the blow-iron itself should during the rolling move bodily in a direction transverse with respect to such axis as in hand marvering. Of course, when the blow-iron moves as just mentioned, the question whether both the opposed surfaces shall move during the rolling or one of them remain stationary will to some extent be determined by a number of factors. One is the rate of the movement of the blow-iron if it is rotated during the marvering otherwise than by contact with one of the moving surfaces and another is its rate of rotation (if produced otherwise than by a separately actuated marvering surface). Other factors are the size of the body of glass and the shape to be given it, whether and to what extent slipping between the surface of the glass and either or both the surfaces against which it is rolled is permissible under the conditions of the particular case, etc. For some specific forms of my method, the opposed surfaces employed may be surfaces of revolution, while for other forms one or both of them may be flat or have some other shape.

In the marvering mechanism illustrated in Figs. 1, 2 and 3, the opposed surfaces between which the gather of glass rotates as above set forth are those of a pair of rolls 1 and 2 mounted so that they may revolve about more or less nearly vertical axes 3 and 4. As shown, the right-hand roll 1 (Fig. 2) is driven by power from the shaft 5,— preferably at a speed such that most of its surface has a linear velocity somewhere in the neighborhood of that of the surface of the rotating gather of glass on the blow-iron 6 when it swings between the rolls during the rearward movement of the blow-iron and moves in the same direction (which is the opposite of that in which the blow-iron swings),—while the left-hand roll 2 is merely mounted so as to revolve freely when the rotating body of glass comes against it, its surface in contact with the glass thus moving in the same direction as that in which the blow-iron swings. The shape of the rolls used at any time will, of course, be such as to give the charge of glass the shape most advantageous for the manufacture of the particular article which is to be made from it; as shown, each of them has a cylindrical surface 7 and a conical surface 8 and the right-hand roll 1 (Fig. 2) has a surface 9 perpendicular to the axis of rotation. When they are set as shown, they give the mass of glass the form of a cylinder and a simple cone set base to base; when they are set farther apart, the cone portion is truncated. While the blow-iron may if necessary be made to pause in its rearward swing with the gather of glass between the rolls, it will usually be sufficient for it to swing more or less slowly through the rolls without a halt,—which is what happens when the cams which actuate the blow-pipe 6 have exactly the forms shown in Fig. 8 of the drawings or in my Patent No. 1,408,000 previously referred to.

The surface 9 of the roll 1 just mentioned is, it will be seen, that of a flange at the lower end of said roll which extends beneath the lower edge of the conical portion 8 and the roll 2. As will be seen from Fig. 3 (in which the axes 3 and 4 are shown in a vertical position with the rolls 1 and 2 removed in order that parts which would otherwise be hidden by the rolls may appear), the spindle which constitutes the axis 3 carries a feather 10 adapted to engage in an internal groove in the roll 1, this mode of connection allowing both rolls to be removed or replaced with others by merely lifting them off the spindles 3 and 4, or vice versa. Provision is made for varying the distance apart of the spindles to vary the distance between the acting surfaces and the rolls or to accommodate rolls of different sizes by mounting said spindles in relatively adjustable parts 11 and 12. As shown, these parts 11 and 12 have slotted lugs 13 and 13' that lie at opposite sides of lug 14 on a part 15 mounted as hereinafter described and a bolt 16 passes through a hole in the lug 14 and through the slots in the lugs 13 and 13' and by tightening the nut on the bolt 16 the parts 11 and 12 can be firmly fixed in the desired relative positions. A double screw member 17 (Fig. 3) mounted at its middle in a lug 18 on a part 15 and secured therein so that it is free to turn but cannot move lengthwise (said screw having a right-hand thread at one side of the lug 18, a left-hand thread at the other and square ends) can be employed to facilitate the adjustment of the parts 11 and 12 and insure that they shall be set at equal distances from the center of the bolt 16 and from the path along which the axis of rotation of the charge of glass swings,—the threaded ends of this member 17 engaging in internally threaded holes in the lugs 19 and 19' on the parts 11 and 12. The lower portion of the spindle 3 is of somewhat smaller diameter than the portion on which the roll 1 is mounted and is loose on the part 16 so as to revolve freely, and its extreme lower end extends into a hole in the uppermost member of a universal joint 20 and is secured by a pin 21. The shaft 22 to which the lowermost member of the universal joint 20 is secured has its bearing in the hub of a U-shaped bracket 23 of the frame structure 24 and is connected with a beveled gear 25 in such a manner that it can slide up and down through said gear but is constrained to turn with it,—there being, as shown, a key-way 26 in the shaft in which the feather in the hub of the gear engages. This gear 25 meshes with a gear 27 on a shaft 28 which has its bearing in the hub 29 on the base portion of the structure 24, and the shaft 28 has on its other end a gear 30 which meshes with a gear 31 on the shaft 5. The spindle 4 is in form similar to the spindle 3, but it is merely secured in the part 12, as by a set-screw 32.

The part 15 above mentioned is mounted in the forked upper end of a part 33 on a bolt 34 (Fig. 2) so that no matter how the conditions of operation may vary the axes 3 and 4 can be brought to a position where they will be more or less nearly parallel to the axis of the blow-iron 6 when the gather of glass thereon passes between the rolls and secured in such position by tightening the nut on said bolt so as to clamp the part 15 and the part 33,—the universal joint 20 permitting the spindle to occupy any desired angular position with reference to the vertical without interference with the driving thereof. Provision is made for adjusting the rolls up and down by having the corners of one side of the part 33 engage and slide in reentrant grooves in an upright portion 35 and the framework 24, the key-way and feather connection between the shaft 22 and the gear 25 permitting this quite freely. The bolt 36 passes through a hole in the part 33 and through a vertical slot in the web portion of the upright 35 and enables the part 33 to be clamped at the desired height, the portion of this bolt which lies in the vertical slot having a rectangular cross-section to facilitate the tightening of the nut on the bolt.

In operation, the glass is gathered on the blow-iron 6 and as the latter passes from the furnace to the mold, the gather on the rotating blow-iron passes between the rolls 1 and 2 which shape it to conform to the space between the rolls.

In Fig. 4 I have shown a modification of my marvering mechanism. In this modification, the bed 37 adjustably holds the frame 38 which carries the marvering rolls. The frame 38 may be raised or lowered with respect to the bed 37 by loosening the bolts 39. The roll 40 is mounted on the shaft 41 so as to rotate freely and is closed on the roll 42 of similar outline which is fastened to the shaft 41 and which has the flange 43 (shown in dotted outline) inserted into the roll 40 to prevent the gather from dropping through to the shaft when the rolls are separated. The distance between the rolls 40 and 42 may be adjusted by means of the slip collar 44 which is held in position by the set screw 45 as shown. The collar 44 also prevents the rolls from being pushed apart by the gather. The shaft 41 is driven through the bevel gear 46 fastened thereto which meshes with a bevel gear 47 on a shaft 48 driven by a motor or any other means.

In operation, the gather of glass on the rotating blow-iron passes between the rolls 40 and 42 which shape the gather to conform to the space between the rolls as the blow-iron passes from the furnace to the mold.

In Figs. 5 and 6 I have shown a form of marvering mechanism in which the opposed surfaces, between which the gather of glass on the blow-iron rotates, are more or less nearly flat in the direction in which the surface of the glass moves with reference to them. In the mechanism shown, some of the surfaces are faces on a part 49 which is movable, and others are on a part 50 which is stationary, and the movement of the part 49 occurs when the glass on the blow-iron 51 is between the parts,—being brought about by the blow-iron 51 itself as the charge of glass on it approaches the parts or comes between them.

As will be seen from Figs. 5 and 6, the movable part 49 slides on ways on a part 52 which is preferably curved to a radius corresponding to the effective length of the blow-iron 51 when the glass thereon is in the marverer. This part 52 has an upstanding flange 53 at one edge, and the part 49 has a groove which fits over the flange 53, and a strip 54 is detachably secured to the lower outer edge of the part 49 and extends beneath the lower outer edge of the part 52 so as to keep 49 from lifting off the flange. The stationary part 50 is mounted about mid-length of the ways on the part 52, while the movable part 49 ordinarily occupies the position at the upper left-hand end of said ways shown in full lines in Fig. 5 but moves downward along said ways to the position shown in dotted lines in Fig. 5 while the blow-iron is swinging past the part 49. The rate of rotation of the blow-iron 51 (which is in the direction indicated by the arrow in Fig. 5) and the rate at which it swings past the part 50 will preferably bear such a relation to one another that the gather of glass will roll over the part 50 without excessive slipping between the surface of said part 50 and the surface of the glass. Under these conditions, however, the linear velocity of the surfaces of the glass which come in contact with the part 49 will be greater than the rate of movement of the blow-iron, so that to avoid any slipping between such surfaces and those of the part 49 the rate at which the part 49 moves downward along the ways as above described during the swinging movement would have to be about twice the rate of swinging of the blow-iron as a whole, and will preferably be at least somewhat quicker than its rate of swinging.

Provision may be made for setting the parts 49 and 50 at different distances apart to vary the diameter and shape which they give to the gather of glass or to allow parts of different forms or dimensions to be employed. As shown, this adjustment is provided for by having on the lower side of the part 52 on which the part 49 slides a projecting portion with transverse edges 55 adapted to fit and slide between the transverse edges of flanges 56 at the upper end of the part 57 on which it is mounted and by having in the upper side of the part 52 a transverse groove in which a transverse ridge 58 on a horizontal flange portion 60 of the stationary part 50 fits and slides, screws 61 which pass through slots in said parts 60 and 52 serving to clamp and fix these parts on the part 52 in any desired position with reference to one another and to the path of the blow-iron. Up and down adjustment of the parts 49 and 50 is provided for by mounting the part 57 so as to slide up and down against ways on the portion 62 of the frame structure, a bolt 63 which passes through a slot in the part 57 serving to clamp the latter part at any desired height.

The movement of the part 49 on its ways may be produced at the proper time by appropriate mechanism driven by a motor or other means, as described in the application of which this is a division. This mechanism is caused to operate by the blow-iron 51 as it brings the gather of glass into the sphere of action of the parts 49 and 50.

In operation, as the blow-iron 51 comes to the marverer on the way from the furnace to the mold, it causes the appropriate mechanism to operate to produce a movement of the part 49. The gather of glass is rotated on the blow-iron 51 between the stationary part 50 and the sliding part 49 so as to shape the glass gather to conform to the space between the parts 49 and 50. After the gather of glass has been marvered passing between the parts 49 and 50 the part 49 is preferably automatically returned to the position shown in full lines in Fig. 5.

In Fig. 8 is shown on a reduced scale the portion of the mechanism for rotating and swinging the blowpipe or spindle 6 to and from the furnace 6'. This is more fully shown and described in my Patent No. 1,408,000 hereinbefore referred to. The rotation of the spindle 6 is secured through the chain drive 64 which through the bevel gearing 65 rotates the shaft 66. The latter rotates the spindle through the bevel gearing 67. The swinging of the blowpipe is caused in part by the rocking of the frame-arm 68 which is actuated by a cam 69. It is also caused by the rod 70 which is actuated by a cam 71. The longitudinal movement of the blowpipe or spindle is secured through the links 72, 73 and 74 controlled by the cam 75 and controlling a lever 76, the other end of which is suitably connected to the blowpipe or spindle by a link 77.

While I have shown and described certain preferred forms of my invention, modifications thereof will readily suggest themselves to those skilled in the art and I do not wish to be limited to the specific forms shown and described.

What I claim as new and desire to secure by Letters Patent of the United States, is,—

1. Mechanism for marvering a charge of glass comprising juxtaposed parts between which the charge of glass passes and is rotated and which are adapted to give the glass the desired form and at least one of which is also adapted to move during the operation aforesaid in such a manner that its surface in contact with the glass travels in a direction transverse with respect to the axis of rotation of the body of glass.

2. A marvering device comprising a pair of juxtaposed members forming therebetween an aperture of predetermined shape, at least one of said parts being loosely mounted and adapted to be driven by the charge of glass during its passage through the said aperture and to roll the said charge of glass into a shape similar to that of the said aperture.

3. The combination with a blow-pipe and a carrying mechanism therefor, of a marvering device comprising a pair of juxtaposed members forming therebetween an aperture of predetermined shape, at least one of said parts being loosely mounted and adapted to be driven by the charge of glass on said blow-pipe during its passage through the said aperture and to roll the said charge of glass into a shape similar to that of the said aperture.

4. In an apparatus for working glass, the combination with a spindle adapted to carrying a gather of glass, means for rotating the said spindle on its longitudinal axis and a marvering part mounted for rotation and adapted to rotate to effect a marver of the gather, being frictionally driven from the glass carried by the said spindle.

5. In an apparatus for working glass, the combination with a spindle adapted to carry a gather of glass, means for rotating the said spindle on its longitudinal axis and for swinging the same and a marvering member mounted so as to be engaged by the gather of glass during the swinging movement of the spindle and to be moved thereby in a direction transverse to that of the axis of said spindle.

6. In an apparatus for working glass, the combination with a spindle adapted to carry a gather of glass, means for rotating the said spindle on its longitudinal axis and a marvering member mounted so as to be engaged by the gather of glass and consisting of a disc and a mounting for the same allowing for its free rotation by contact with said gather of glass.

In witness whereof, I have hereunto set my hand this twenty-ninth day of January, 1920.

NOBLE W. HARTMAN.